April 24, 1928.  T. MIDGLEY.  1,667,129

MOLD ALIGNING MEANS

Filed March 5, 1925

INVENTOR
Thomas Midgley
BY Edward C. Taylor
ATTORNEY

Patented Apr. 24, 1928.

1,667,129

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

MOLD-ALIGNING MEANS.

Application filed March 5, 1925. Serial No. 13,100.

This invention relates to molds adapted for vulcanizing articles such as tire casings. In the manufacture of automobile tires the unvulcanized articles are enclosed within a metallic mold, usually of two part construction, and subjected to vulcanizing heat for the requisite period. Commonly the outer part of the molding cavity is formed with recesses in the reverse of the pattern desired upon the tread of the tire. Until the rubber has had a chance to flow into these recesses the mold halves cannot come quite together, for the rubber is incompressible and the tire necessarily is made large enough so that it will have sufficient material to fill up these recesses. The usual aligning means for securing registry of the mold halves are defective in that they do not properly align the mold until the halves have approached so closely that they have closed upon the rubber, after which they cannot be shifted.

It is the object of my invention to provide mold aligning means by which the mold halves can be brought into registry before they have approached closely enough to grip the tire, and which will still have sufficient strength to avoid breakage or bending. It is a further object to provide mold aligning means which will have no tendency to bind during closure of the mold, insuring a smooth and even action. Other objects will appear from the description and claims.

Referring to the drawings.

Figure 1:
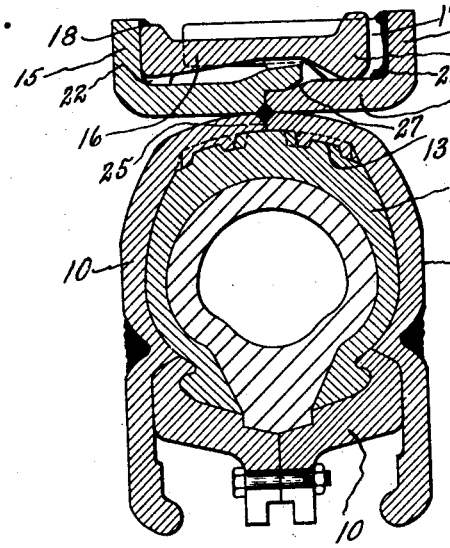
Fig. 1 is a section on line 1—1 of Fig. 3, through two mold halves in closed position, showing the aligning means fully engaged.
Figure 3:
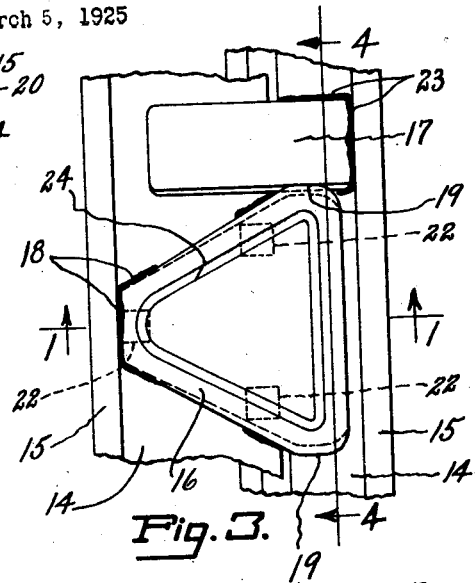
Fig. 3 is an enlarged detail on line 3—3 of Fig. 2.
Figure 4:
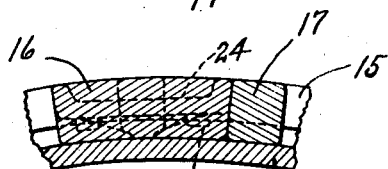
Figure 5:
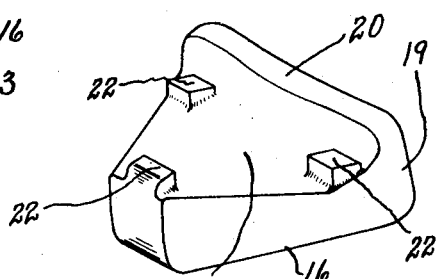
Figure 6:
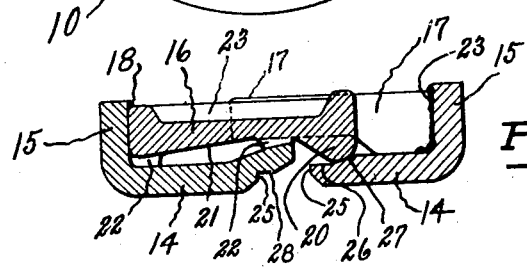

Fig. 4 in a section, on a reduced scale, on line 4—4 of Fig. 3;

Fig. 5 is a perspective view of a part of the aligning device, inverted to show the construction of the bottom side as viewed in Figs. 1 and 3; and Fig. 6 is a fragmentary view similar to Fig. 1 but showing the mold halves in the process of closing.

The aligning device is shown in the present instance as applied to a mold having mating halves or side plates 10 and bead rings 11, but is applicable to molds of other specific types. The molding recesses to produce the tread pattern on the tire 12 are shown at 13. Attached to the mold, in the form shown, are rings 14 bent outwardly at 15 to form supporting flanges upon which the mold may rest when in stack formation in a heater. The aligning devices are shown as carried by the rings 14 but may be supported otherwise, as directly by the side plates, when applied to molds of other types.

Figure 2:
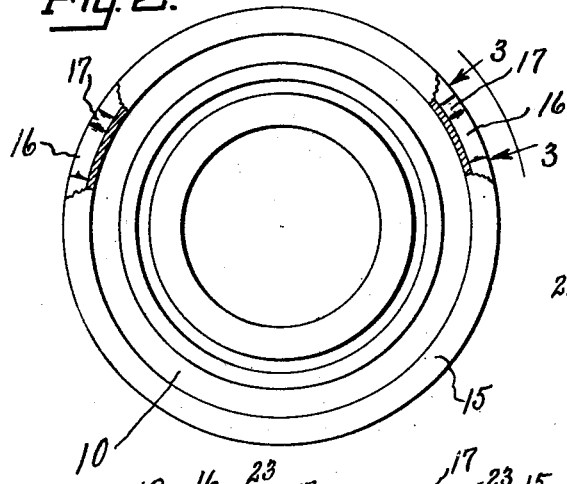
Fig. 2 is a side elevation of a mold, partially broken away to show the aligning devices.

Before speaking of the purpose of the manner of positioning the aligning devices on the mold shown in Fig. 2, it will be convenient to describe one specific form of device. Each device consists of two parts, a cam piece 16 and a block 17. In addition to these parts the mold itself performs one aligning function as will be described more fully below. The cam piece is attached at one end to the ring 14 and flange 15 of one mold half as by welding indicated by 18. It has a cam surface 19, preferably rounded, for coaction with the block 17; and another cam surface 20, also preferably rounded, for coaction with the opposite mold half. Its bottom side is concaved at 21 to clear certain outwardly projecting parts of the mold. Positioning lugs 22 assist in locating the cam piece during welding and in supporting it thereafter. Block 17 is secured, as by welding at 23, to the opposite ring 14. In the drawings cam piece 16 is shown as triangular in form with a cam surface 19 on two corners. This is merely for convenience in being able to make the pieces in a single style serving both for right and left hand. Only one surface 19 on a single piece performs any function. The upper surface of the piece 16 may be hollowed out as at 24 for lightness.

The mold halves have surfaces 25 preferably coming together at or near the centeral plane of the mold. One ring 14 is shouldered at 26, and is provided with a slanting portion 27 for coaction with the cam surface 20. The other ring is suitably fitted to interlock with the first, a shoulder 28 mating with shoulder 26 to insure complete alignment when the mold halves are assembled and pressed together.

Two sets of aligning devices are used in a mold, both at one side of a diameter, as shown in Fig. 2, and preferably about 120° apart, instead of being mounted diametrically opposite each other as mold dowels of the usual type are. This mounting permits the aligning devices to center the mold in two directions as it is being closed, due to the combined action of cam surfaces 19 and 20 of each unit with the corresponding bearing surface.

In use, the two mold halves, with the uncured tire in one of them, are brought together slowly, preferably by lowering the empty half onto the one containing the tire. Before the empty mold half contacts with the tire at all, it can readily be steered so that the two cam pieces 16 contact with their respective blocks 17, and so that the cam surfaces 20 ride up on the slanting surfaces 27 of the opposite mold half. This condition is illustrated in Fig. 6, where the wide separation of the mold halves is indicated by the space between surfaces 25. The registration of the two parts of the mold proceeds smoothly and gradually, and yet positively, the ultimate result being accurate alignment before the top mold half is pressed against the rubber.

While the preferred form of the device has been described necessarily in some detail it will be apparent that changes in form may be made as required by the design of the mold to which the device is to be fitted or as desired from choice.

Having thus described my invention, I claim:

1. A centering means for a split tire mold in which a plurality of centralizing units are used, each having but two sets of mating bearing surfaces, one to limit radial movement in but one direction and the other to limit circumferential movement in but one direction, said units being all located to one side of a diametral plane through the mold.

2. A tire mold separated into two sections upon a plane perpendicular to the axis of the mold, one section having a registering flange projecting towards the other mold half, a plurality of blocks both at one side of a diametral plane through the mold carried by one mold section, and a plurality of guiding pieces arranged similarly to the blocks but carried by the other mold section, each guiding piece having a surface coacting with the projecting flange of the other mold section and a surface coacting with one of the blocks, one block being on the reverse side of its guiding piece from another block.

THOMAS MIDGLEY.